US011111440B1

(12) United States Patent
Otterstrom

(10) Patent No.: US 11,111,440 B1
(45) Date of Patent: Sep. 7, 2021

(54) APPARATUS, SYSTEM, AND METHOD FOR SHALE PYROLYSIS

(71) Applicant: PYRO DYNAMICS LLC, Pleasant Grove, UT (US)

(72) Inventor: Gary G. Otterstrom, Lindon, UT (US)

(73) Assignee: PYRO DYNAMICS, LLC, Lindon, UT (US)

( * ) Notice: Subject to any disclaimer, the term of this patent is extended or adjusted under 35 U.S.C. 154(b) by 0 days.

(21) Appl. No.: 17/188,836

(22) Filed: Mar. 1, 2021

Related U.S. Application Data

(60) Provisional application No. 62/982,636, filed on Feb. 27, 2020.

(51) Int. Cl.
| | |
|---|---|
| *C10B 49/04* | (2006.01) |
| *C10B 49/06* | (2006.01) |
| *C10B 1/04* | (2006.01) |
| *C10B 1/08* | (2006.01) |
| *C10B 53/06* | (2006.01) |
| *C10B 1/06* | (2006.01) |

(52) U.S. Cl.
CPC .............. *C10B 49/06* (2013.01); *C10B 1/04* (2013.01); *C10B 1/06* (2013.01); *C10B 1/08* (2013.01); *C10B 49/04* (2013.01); *C10B 53/06* (2013.01)

(58) Field of Classification Search
CPC .......... C10B 53/04; C10B 53/06; C10B 1/04; C10B 1/08; C10B 47/18; C10B 3/00; C10B 3/02; C10B 49/02; C10B 49/04; C10B 49/06; C10G 1/02; C10J 2300/0976; C10J 3/22
USPC ....................................................... 202/221
See application file for complete search history.

(56) References Cited

U.S. PATENT DOCUMENTS

| | | | | |
|---|---|---|---|---|
| 1,598,217 A | * | 8/1926 | Odell ................. | C10B 1/04 |
| | | | | 201/33 |
| 1,766,132 A | * | 6/1930 | Kraul ................. | C10B 1/04 |
| | | | | 202/124 |
| 1,800,366 A | * | 4/1931 | Stewart .............. | C10G 1/02 |
| | | | | 202/221 |

(Continued)

FOREIGN PATENT DOCUMENTS

GB  487983 A  6/1938

OTHER PUBLICATIONS

PCT Application No. PCT/US2018/048614 filed Aug. 29, 2018, Written Opinion of the International Searching Authority dated Feb. 7, 2019.

(Continued)

*Primary Examiner* — Jonathan Luke Pilcher
(74) *Attorney, Agent, or Firm* — Kunzler Bean & Adamson; Bruce R. Needham

(57) ABSTRACT

Apparatuses, systems, and methods are disclosed for shale pyrolysis. A retort may include a first side and a second side opposite the first side, where the first side and the second side include descending angled surfaces at alternating angles to produce zig-zag motion of shale descending through the retort. Steam distributors may be coupled to the first side, with collectors coupled to the second side, to produce crossflow of steam and heat across the descending shale. A steam temperature control subsystem may be coupled to the steam distributors and may deliver higher-temperature steam to an upper portion of the retort and lower-temperature steam to a lower portion of the retort.

18 Claims, 13 Drawing Sheets

(56) References Cited

U.S. PATENT DOCUMENTS

| | | | | |
|---|---|---|---|---|
| 1,938,596 A * | 12/1933 | Karrick | C10B 1/04 | 202/221 |
| 1,967,691 A * | 7/1934 | Traut | C10B 1/08 | 202/104 |
| 2,560,767 A * | 7/1951 | Huff | C10G 1/02 | 201/29 |
| 2,752,292 A | 6/1956 | Scott, Jr. | | |
| 3,371,429 A * | 3/1968 | Miller | F26B 17/1433 | 34/171 |
| 3,377,266 A | 4/1968 | Salnikov | | |
| 3,384,569 A | 5/1968 | Peet | | |
| 3,801,469 A * | 4/1974 | Essenhigh | C10B 49/04 | 201/17 |
| 3,972,801 A | 8/1976 | Gregoli | | |
| 4,010,092 A | 3/1977 | Deering | | |
| 4,038,154 A * | 7/1977 | Barnebey | C10B 1/04 | 202/93 |
| 4,464,247 A | 8/1984 | Thacker | | |
| 4,539,917 A * | 9/1985 | Mallon | B01J 8/087 | 110/225 |
| 4,600,476 A | 7/1986 | Edwards | | |
| 4,601,811 A * | 7/1986 | Lewis | C10G 1/02 | 201/34 |
| 4,619,738 A * | 10/1986 | Lewis | C10G 1/02 | 201/28 |
| 4,880,528 A | 11/1989 | Westhoff et al. | | |
| 4,900,429 A | 2/1990 | Richardson | | |
| 7,293,511 B2 * | 11/2007 | Prigmore | C10B 53/02 | 110/341 |
| 7,798,077 B2 * | 9/2010 | Gehring | F23G 5/027 | 110/229 |
| 8,328,992 B1 * | 12/2012 | Swain | C10B 1/04 | 202/108 |
| 10,047,296 B2 * | 8/2018 | Wang | C10B 31/02 | |
| 10,829,693 B2 * | 11/2020 | Otterstrom | C10B 1/04 | |
| 2005/0194244 A1 | 9/2005 | Merrell et al. | | |
| 2008/0314726 A1 | 12/2008 | Choros | | |
| 2019/0062637 A1 | 2/2019 | Otterstrom | | |

OTHER PUBLICATIONS

PCT/US2021/020338 filed Mar. 1, 2021, "Written Opinion of the International Searching Authority", dated May 27, 2021, pp. 1-8.

* cited by examiner

APPARATUS, SYSTEM, AND METHOD FOR SHALE PYROLYSIS

CROSS-REFERENCES TO RELATED APPLICATIONS

This application claims the benefit of U.S. Provisional Patent Application No. 62/982,636 entitled "APPARATUS, SYSTEM, AND METHOD FOR SHALE PYROLYSIS" and filed on Feb. 27, 2020 for Gary G. Otterstrom, which is incorporated herein by reference.

FIELD

The subject matter disclosed herein relates to oil and gas production and more particularly relates to shale pyrolysis.

BACKGROUND

Oil and gas may be produced from oil shale by a process of pyrolysis. At suitably high temperatures, kerogen in the shale thermally decomposes, releasing gases and vapors that may be recovered as shale gas and shale oil. Although oil shale is abundant, shale oil production costs have, at times, been uncompetitive with economical sources of conventional crude oil. Shale oil production costs may include the cost of retorting equipment with limited throughput, pre-production costs (e.g., to meet shale particle size limits), energy costs, water costs, and the like.

SUMMARY

Apparatuses, systems, and methods are disclosed for shale pyrolysis. A system, in one embodiment, includes a retort, steam distributors and collectors, and a steam temperature control subsystem. A retort, in one embodiment, includes a first side and a second side opposite the first side. In a further embodiment, the first side and the second side include descending angled surfaces at alternating angles to produce zig-zag motion of shale descending through the retort. In one embodiment, steam distributors are coupled to the first side and collectors are coupled to the second side, to produce crossflow of steam and heat across the descending shale from the first side to the second side. A steam temperature control subsystem, in one embodiment, is coupled to the steam distributors and configured to deliver higher-temperature steam to an upper portion of the retort and lower-temperature steam to a lower portion of the retort.

An apparatus for shale pyrolysis, in one embodiment, includes a retort, and hot gas distributors and collectors. A retort, in one embodiment, includes a first side and a second side opposite the first side. In further embodiments, the first side and the second side include descending angled surfaces at alternating angles to produce zig-zag motion of shale descending through the retort. Hot gas distributors, in one embodiment, are coupled to the first side, and collectors are coupled to the second side, to produce crossflow of a hot gas across the descending shale from the first side to the second side.

A method for shale pyrolysis, in one embodiment, includes providing a retort including a first side and a second side opposite the first side. The first side and the second side may include descending angled surfaces at alternating angles to produce zig-zag motion of shale descending through the retort. In a further embodiment, the method includes providing steam distributors coupled to the first side and collectors coupled to the second side to produce crossflow of steam and heat across the descending shale from the first side to the second side. In a further embodiment, the method includes providing a steam temperature control subsystem coupled to the steam distributors and configured to deliver higher-temperature steam to an upper portion of the retort and lower-temperature steam to a lower portion of the retort. In a further embodiment, the method includes filling the retort with shale, and moving shale through the retort by continuously removing shale at the bottom of the retort and adding shale at the top. In a further embodiment, the method includes pyrolyzing the shale by using the steam temperature control subsystem and the steam distributors to deliver the higher-temperature steam to the upper portion of the retort and the lower-temperature steam to the lower portion of the retort. In a further embodiment, the method includes removing shale pyrolysis gases and the steam via the collectors.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
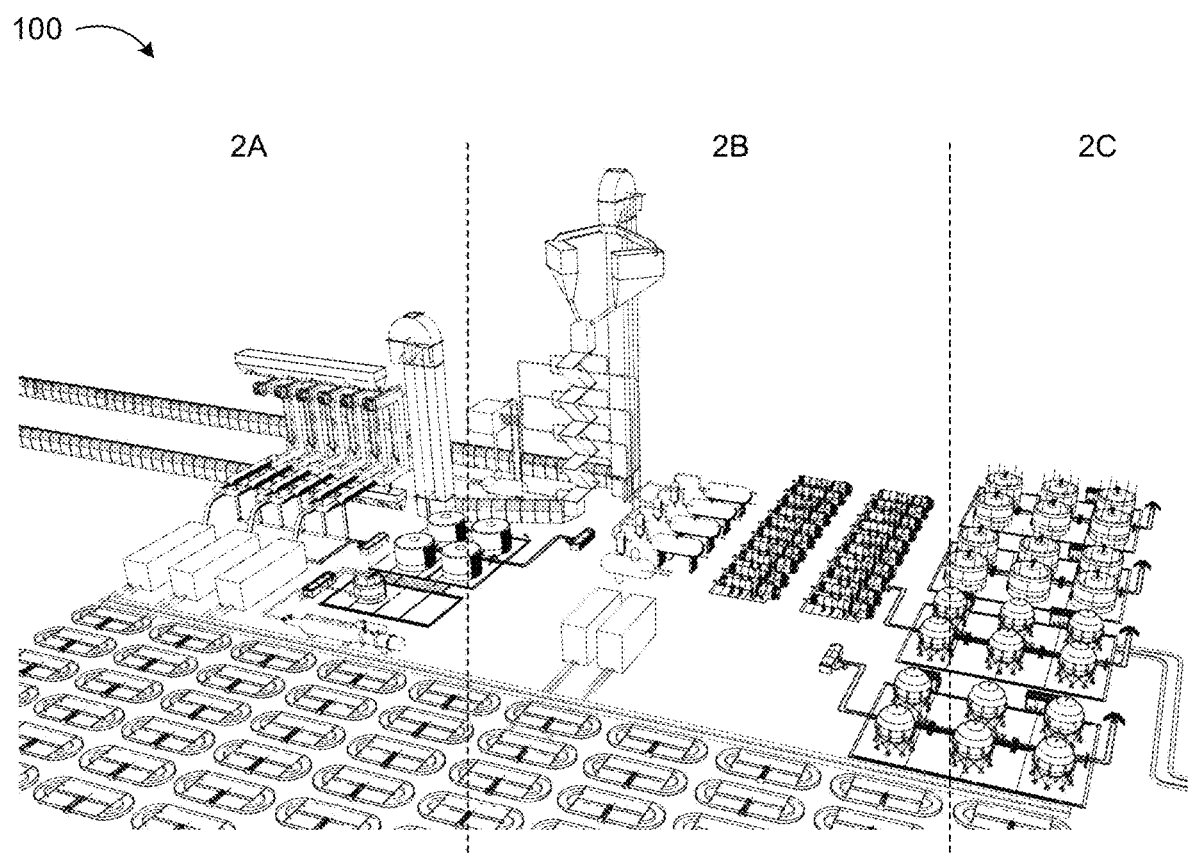
FIG. 1 is a perspective view illustrating one embodiment of a shale pyrolysis system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects, components, or subsystems of one embodiment of a shale pyrolysis system are described herein. The described aspects, components, or subsystems may be used in combination as described herein, or may be used individually, or in subcombinations in other embodiments of shale pyrolysis systems, alongside other shale pyrolysis components or subsystems. For example, a retort and a distillation subsystem are described herein, but the retort may be used with a distillation column other than the described distillation subsystem, or the distillation subsystem may be used with a retort other than the described retort.

Apparatuses, systems, and methods are disclosed for shale pyrolysis. A system, in one embodiment, includes a retort, steam distributors and collectors, and a steam temperature control subsystem. A retort, in one embodiment, includes a first side and a second side opposite the first side. In a further embodiment, the first side and the second side include descending angled surfaces at alternating angles to produce zig-zag motion of shale descending through the retort. In one embodiment, steam distributors are coupled to the first side and collectors are coupled to the second side, to produce crossflow of steam and heat across the descending shale from the first side to the second side. A steam temperature control subsystem, in one embodiment, is coupled to the steam distributors and configured to deliver higher-temperature steam to an upper portion of the retort and lower-temperature steam to a lower portion of the retort.

In some embodiments, the steam temperature control subsystem includes one or more heaters for increasing steam temperature, and a plurality of steam/water mixers for reducing steam temperature to a plurality of different temperatures for delivery to different portions of the retort. In some embodiments, the plurality of steam/water mixers are configured to produce steam above 600° F. for distribution to a preheat section of the retort, steam above 750° F. for distribution to the upper portion of the retort, and steam below 300° F. for distribution to the lower portion of the retort.

The retort, in some embodiments, includes a preheat section for receiving and preheating shale entering the top of the retort. In some embodiments, the preheat section includes a plurality of preheat steam distributors disposed between the first side and the second side. In some embodiments, the preheat steam distributors include hollow vertical rods with side ports. The hollow vertical rods may extend downward from a grate with hollow members for receiving steam and distributing steam to the hollow vertical rods.

In some embodiments, a system includes a shale combustion subsystem, including one or more combustion chambers for combustion of pyrolyzed shale received from the retort, and one or more heat exchangers for superheating steam for the steam temperature control subsystem, using heat from the combustion of the pyrolyzed shale. In some embodiments, the shale combustion subsystem further includes one or more boilers for producing the steam. The one or more boilers may be configured to heat pressurized water and produce steam at one or more pressure release valves, and the shale combustion subsystem may include a pump for providing pressurized water to the boilers.

In some embodiments, one or more heat exchangers for superheating steam include vertical compartments for ascending steam to be heated by descending shale particles and combustion gases. In further embodiments, one or more boilers may include horizontal compartments for water to be heated by gases from which solids have been removed. In some embodiments, the shale combustion subsystem further includes one or more cyclonic separators disposed between the one or more heat exchangers for superheating steam and the one or more boilers, for removing the solids from the gases. In some embodiments, a system may include one or more filter houses, which may include iron-zinc filters for removing hydrogen sulfide from a horizontal flow of combustion gases, and a vertical flow of water for removing carbon dioxide from the combustion gases.

In some embodiments, a system may include a distillation subsystem, including a plurality of liquid/gas separation vessels that receive gases from the retort, and a plurality of organic Rankine cycle (ORC) generators corresponding to the separation vessels. In some embodiments, the ORC generators are coupled to and powered by heat exchangers of the separation vessels, and include different working fluids to produce different condensation temperatures for gases in different separation vessels. The separation vessels may be coupled in a chain so that gases exiting earlier separation vessels in the chain are received by later separation vessels in the chain. In some embodiments, the separation vessels may include four separation vessels for condensing hydrocarbons at different condensation temperatures, and a fifth separation vessel for condensing water.

An apparatus for shale pyrolysis, in one embodiment, includes a retort, and hot gas distributors and collectors. A retort, in one embodiment, includes a first side and a second side opposite the first side. In further embodiments, the first side and the second side include descending angled surfaces at alternating angles to produce zig-zag motion of shale descending through the retort. Hot gas distributors, in one embodiment, are coupled to the first side, and collectors are coupled to the second side, to produce crossflow of a hot gas across the descending shale from the first side to the second side.

In some embodiments, the hot gas is steam. In further embodiments, a steam temperature control subsystem may be coupled to the hot gas distributors and configured to deliver higher-temperature steam to an upper portion of the retort and lower-temperature steam to a lower portion of the retort.

A method for shale pyrolysis, in one embodiment, includes providing a retort including a first side and a second side opposite the first side. The first side and the second side may include descending angled surfaces at alternating angles to produce zig-zag motion of shale descending through the retort. In a further embodiment, the method includes providing steam distributors coupled to the first side and collectors coupled to the second side to produce crossflow of steam and heat across the descending shale from the first side to the second side. In a further embodiment, the method includes providing a steam temperature control subsystem coupled to the steam distributors and configured to deliver higher-temperature steam to an upper portion of the retort and lower-temperature steam to a lower portion of the retort. In a further embodiment, the method includes filling the retort with shale, and moving shale through the retort by continuously removing shale at the bottom of the retort and adding shale at the top. In a further embodiment, the method includes pyrolyzing the shale by using the steam temperature control subsystem and the steam distributors to deliver the higher-temperature steam to the upper portion of the retort and the lower-temperature steam to the lower portion of the retort. In a further embodiment, the method includes removing shale pyrolysis gases and the steam via the collectors.

In some embodiments, a method includes providing a preheat section of the retort, including a plurality of preheat steam distributors disposed between the first side and the second side. In further embodiments, a method includes delivering steam to the preheat section to preheat shale entering the top of the retort. In some embodiments, a method includes combusting pyrolyzed shale received from the retort to produce and superheat steam for the steam temperature control subsystem.

In some embodiments, a method includes providing a plurality of liquid/gas separation vessels coupled in a chain so that gases exiting earlier separation vessels in the chain are received by later separation vessels in the chain. In further embodiments, a method includes directing gases from the retort through the plurality of separation vessels to remove condensable hydrocarbons and water from the gases. In some embodiments, a method includes providing a plurality of organic Rankine cycle (ORC) generators coupled to and powered by heat exchangers of the separation vessels, where the ORC generators include different working fluids to produce different condensation temperatures for gases in different separation vessels. In further embodiments, a method includes removing different distillation cuts of condensed hydrocarbons, corresponding to the different condensation temperatures, from the separation vessels, and using the ORC generators to produce electricity using heat from condensing the hydrocarbons.

Figure 2A:
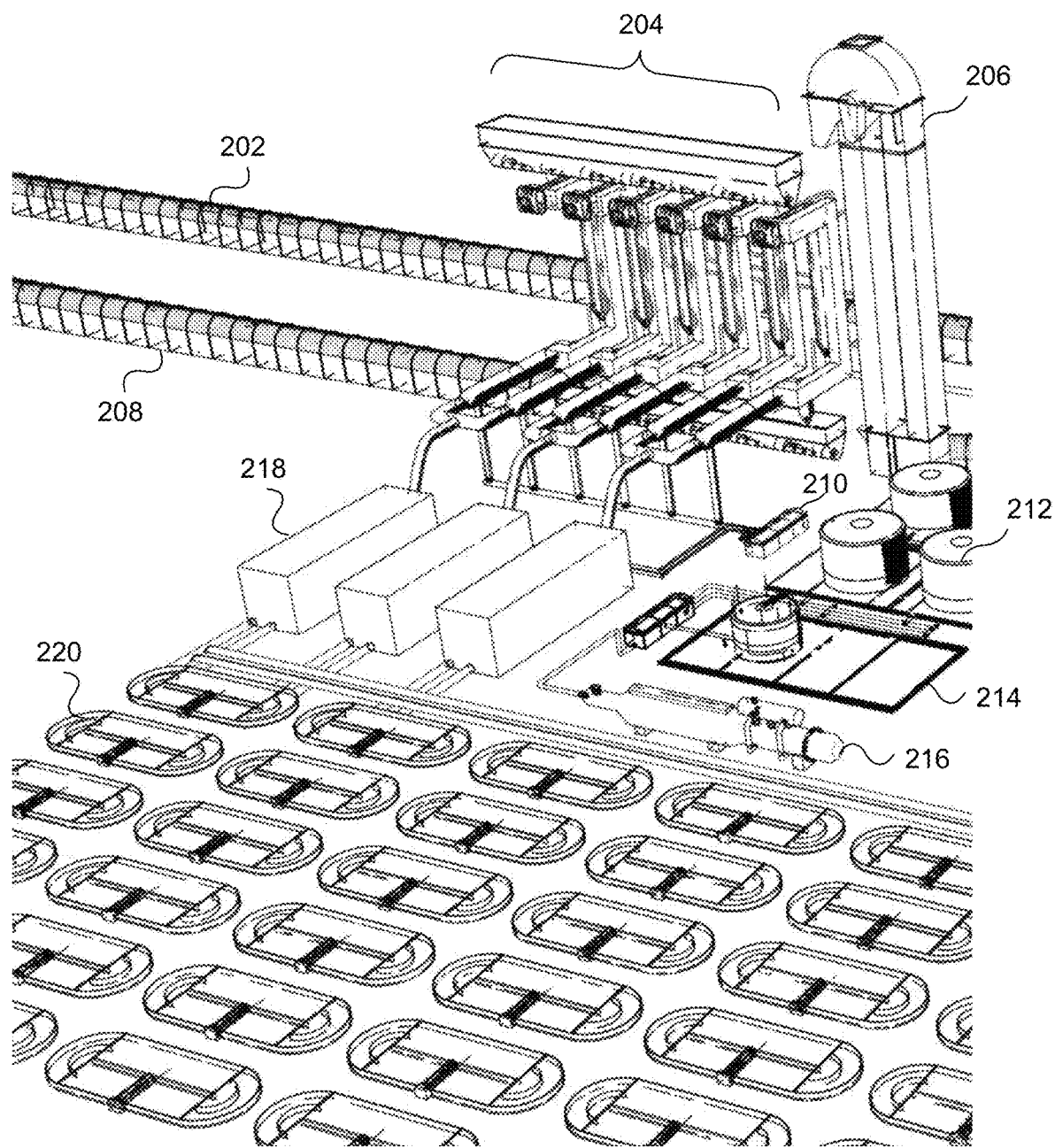
FIG. 2A is a partial view of the shale pyrolysis system of FIG. 1.
Figure 2B:
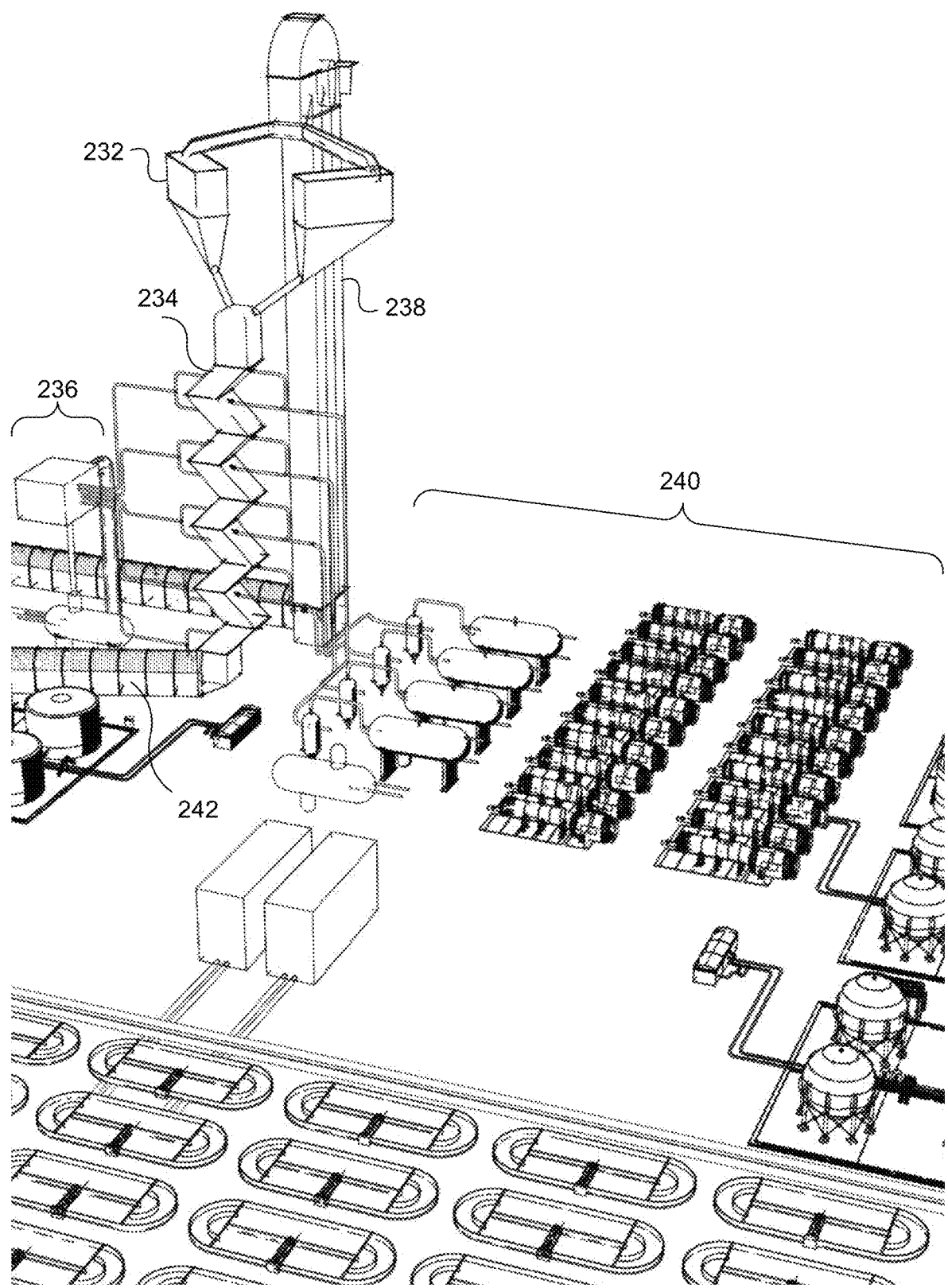
FIG. 2B is a partial view of the shale pyrolysis system of FIG. 1.
Figure 2C:
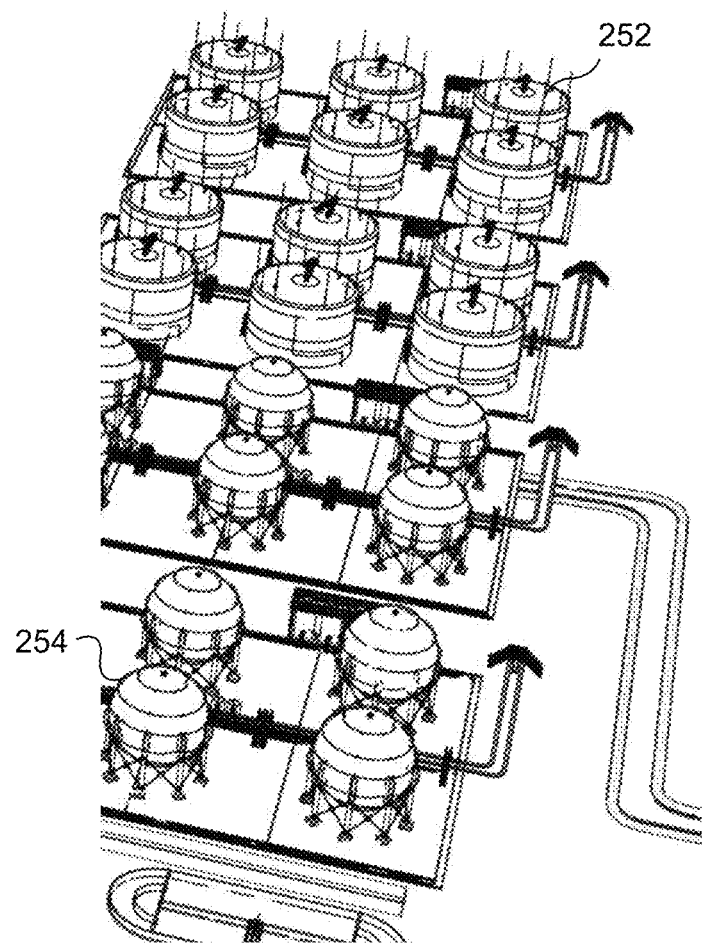
FIG. 2C is a partial view of the shale pyrolysis system of FIG. 1.

FIG. 1 is a perspective view illustrating one embodiment of a shale pyrolysis system 100. Partial views of the shale pyrolysis system 100 are depicted in FIGS. 2A, 2B, and 2C, while FIG. 1 is a smaller scale view showing the whole formed by the partial views, and indicating the positions of the partial views relative to the whole. Dashed lines in FIG. 1 indicate the edges of the partial views of FIGS. 2A, 2B, and 2C.

Referring to FIG. 2A, the depicted embodiment of a shale pyrolysis system 100 includes horizontal conveyors 202, 208, a shale combustion subsystem 204, a vertical conveyor 206, a pump 210, feedwater tanks 212, a sulfuric acid plant 214, a sulfuric acid storage tank 216, filter houses 218, and algae ponds 220. Referring to FIG. 2B, the depicted embodiment of a shale pyrolysis system 100 further includes hoppers 232, a retort 234, a steam temperature control subsystem 236, a vertical conveyor 238, a distillation subsystem 240, and a horizontal conveyor 242. Referring to FIG. 2C, the depicted embodiment of a shale pyrolysis system 100 includes liquid storage tanks 252 and gas storage tanks 254. Operation of the system 100 is first briefly described below with reference to FIGS. 2A, 2B, and 2C as a whole, and then individual components are described in further detail below with reference to subsequent Figures.

In the depicted embodiment, a horizontal conveyor 202 and a vertical conveyor 238 convey shale to one or more hoppers 232 above a retort 234. In general, in various embodiments, shale is heated in a retort 234 where pyrolysis occurs, releasing gases from thermal decomposition of kerogen in the shale. The gases include hydrocarbons which may be separated into different distillate cuts or fractions by a distillation subsystem 240. The gases may also include steam, which may similarly be condensed by the distillation subsystem 240. Liquid and gaseous products of the distillation subsystem 240 may be stored in liquid storage tanks 252 and gas storage tanks 254, respectively. Liquid storage tanks 252 store oil fractions produced by the distillation subsystem 240, while gas storage tanks 254 store non-condensed gases such as hydrogen, carbon dioxide, hydrogen sulfide and lighter hydrocarbons (e.g., methane through hexane).

In the depicted embodiment, the retort 234 includes opposite sides (to the left and to the right in FIG. 2B) with descending angled surfaces at alternating angles to produce zig-zag motion of shale descending through the retort 234. Thus, the retort 234 in the depicted embodiment is itself zig-zag shaped. In the depicted embodiment, steam distributors are coupled to a first side of the retort 234 (to the left in FIG. 2B), and collectors are coupled to a second side opposite the first side (to the right in FIG. 2B), to produce a crossflow of steam and heat across the descending shale from the first side to the second side. In the depicted embodiment, the steam temperature control subsystem 236 is coupled to the steam distributors at the left of the retort 234, and is configured to deliver higher-temperature steam to an upper portion of the retort 234 and lower-temperature steam to a lower portion of the retort 234. The flow of steam across the retort 234 heats and pyrolyzes the shale, so that steam and pyrolysis gases are removed from the retort 234 at the collectors. In various embodiments, a retort 234 as described herein may be capable of pyrolyzing a variety of types of shale with different minerology and different kerogen content.

In the depicted embodiment, the retort 234 is filled with shale, which is moved through the retort 234 from top to bottom, by removing shale at the bottom of the retort 234 and adding shale at the top. For example, shale may be moved from hoppers 232 into the top of the retort 234 by augers, and may similarly be moved from the bottom of the retort 234 to a horizontal conveyor 242 by augers. The pyrolyzed shale removed from the retort 234 may include combustible material, such as various carbon compounds that were not vaporized in the retort 234 during pyrolysis. In the depicted embodiment, the horizontal conveyor 242 and the vertical conveyor 206 convey the pyrolyzed shale to a shale combustion subsystem 204, where the shale is combusted.

(Shale may also include minerals that are not broken down by pyrolysis or consumed by combustion. Terms such as "shale pyrolysis" and "shale combustion" should be understood to refer to processes that affect portions of the shale, such as kerogen decomposing in the process of pyrolysis, and carbon solids reacting with oxygen in the process of combustion. Such terms do not imply that the entirety of the shale is either pyrolyzed or combusted.)

In the depicted embodiment, a pump 210 pumps water from feedwater tanks 212 into the shale combustion subsystem 204, which uses heat from combustion of the pyrolyzed shale to boil the water (producing steam), and to superheat the resulting steam. Boiling water and superheating the steam produces pressure to move the steam from the shale combustion subsystem 204 to the steam temperature control subsystem 236. The combusted shale cooled by heat transfer to the water/steam is removed from the system 100 by horizontal conveyor 208. Gases from shale combustion, also cooled by heat transfer to the water/steam are processed through filter houses 218 to remove hydrogen sulfide and carbon dioxide. The hydrogen sulfide may be converted to sulfuric acid at a sulfuric acid plant 214, and stored in a sulfuric acid storage tank 216. Carbon dioxide may be dissolved into water, and the resulting carbon enriched water may be provided to one or more algae ponds 220. Algae in ponds 220 may process carbon dioxide by photosynthesis to produce algae oil. Thus, in various embodiments, outputs of the system 100 may include hydrocarbons from pyrolysis, sulfuric acid, and/or algae oil.

Various steps or components described herein as interrelated can be run semi-independently for a period of time (e.g., the system 100 as a whole may continue operating if an individual component or subsystem is offline for maintenance). For example, the steam temperature control subsystem 236 may temper superheated steam from the shale combustion subsystem 204, or may produce steam or add heat to steam if the shale combustion subsystem 204 is not producing steam at a desired temperature. Shale in the retort 234 may have a large thermal mass, allowing some extra heat to be added to or removed from the retort as needed. Electrical generators in the distillation subsystem 240 may be operated across a wide temperature range without needing extensive human supervision for temperature changes. Water may be buffered in the feedwater tanks 212 allowing steam to be produced as needed. Thus, various subsystems or components that depend on each other include buffers for energy or material, allowing the system 100 as a whole to be started up, maintained, or operated across a variety of working conditions without requiring a large degree of coordination between the components and subsystems.

Figure 3:
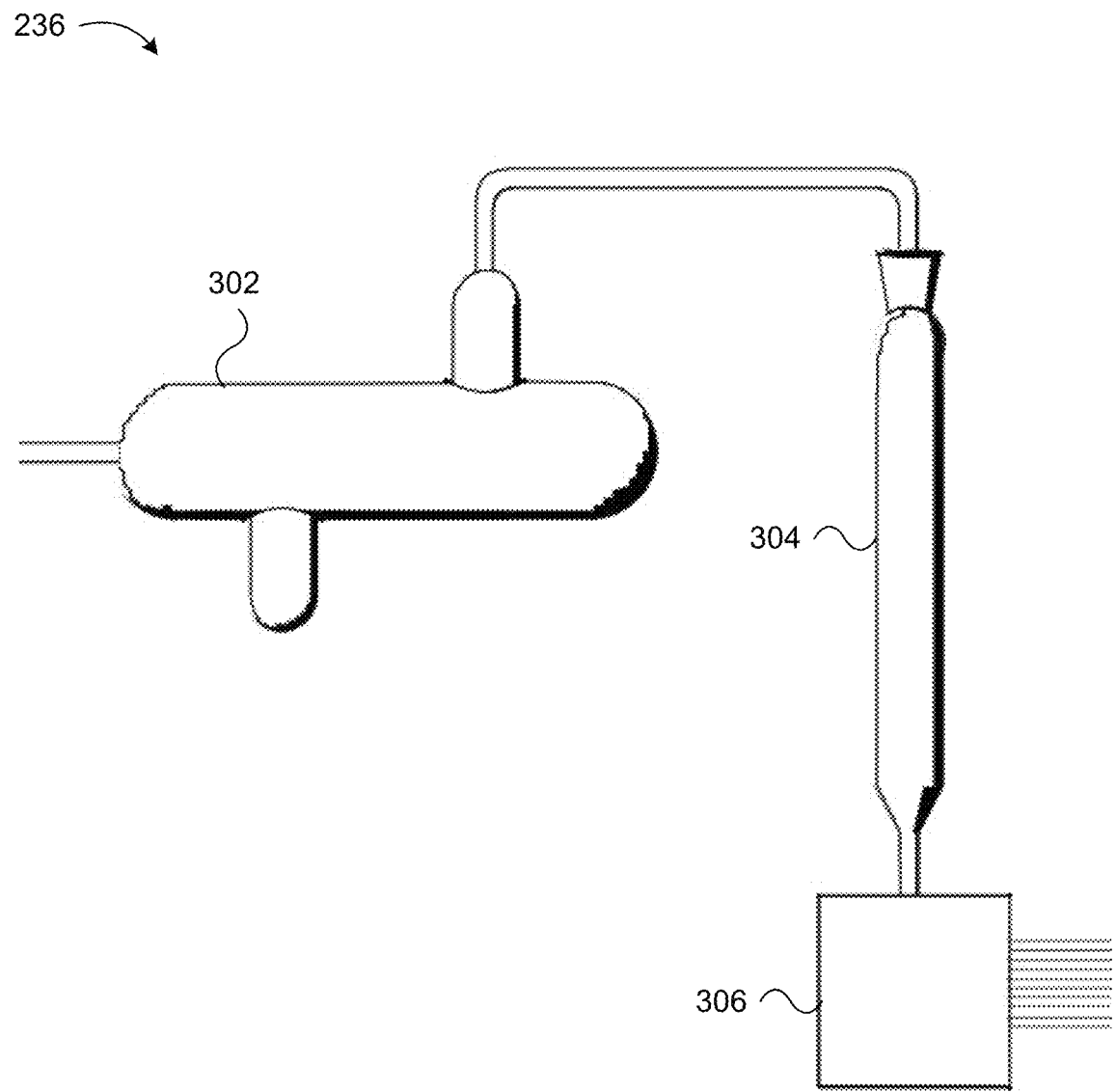
FIG. 3 is a diagram illustrating one embodiment of a steam temperature control subsystem.

FIG. 3 is a diagram illustrating one embodiment of a steam temperature control subsystem 236, as described above. In the depicted embodiment, the steam temperature control subsystem 236 includes heaters 302, 304 and one or more steam/water mixers 306, which are described below.

Lines, pipes or other connectors between components or subsystems in the Figures are intended, as in an electrical schematic diagram, to indicate how components or subsystems are coupled together and are not intended to imply exact spatial relationships between components. For example, the vertical and/or horizontal positions of heaters 302, 304 and steam/water mixers 306 in a system 100 may or may not be as depicted in FIG. 3, but the flow of steam between the components is illustrated by pipes. In the depicted embodiment, the steam temperature control subsystem 236 receives steam from the shale combustion subsystem from the pipe depicted entering the left of FIG. 3, and delivers steam to steam distributors at various portions of the retort 234 via the pipes depicted exiting the right of FIG. 3.

In general, in various embodiments, a steam temperature control subsystem 236 is coupled to steam distributors at the retort 234, and is configured to deliver higher-temperature steam to an upper portion of the retort 234 and lower-temperature steam to a lower portion of the retort 234. With crossflow of steam across the retort 234 from a first side to a second side, delivering higher temperature steam to the upper portion of the retort 234 heats shale near the first side to a hot enough temperature for pyrolysis in the upper portion. Then, as the shale descends through the retort 234, delivering lower temperature steam to the lower portion of the retort 234 cools the already pyrolyzed shale near the first side and drives a zone of higher temperature towards the second side of the retort 234 to pyrolyze shale in the interior of the retort 234 and at the second side. This process is described in further detail below with reference to FIG. 4.

In some embodiments, a steam temperature control subsystem 236 includes one or more heaters 302, 304 for increasing steam temperature. In the depicted embodiment, the steam temperature control subsystem 236 includes two heaters 302, 304. In another embodiment, a steam temperature control subsystem 236 may include more or fewer heaters. In the depicted embodiment, heater 302 is a combustion heater (e.g., an oxy-fuel burner or an air-fuel burner) that burns fuel to increase the temperature of the steam received from the shale combustion subsystem 204. As depicted in FIG. 3, a heater 302 may be disposed in or preceded by a liquid/gas separator to remove any condensate from the incoming steam. In the depicted embodiment, heater 304 is an electric heater that uses one or more resistive heating elements (such as CALROD® heating elements) to increase the temperature of the steam. Various other or further types of heaters may similarly be used to increase steam temperature in a steam temperature control subsystem 236.

At times, steam received by the steam temperature control subsystem 236 from the shale combustion subsystem 204 may already be at or above the highest temperature that the steam temperature control subsystem 236 provides to the retort 234, in which case heaters 302, 304 may not be used. However, at other times, steam may not be available from the shale combustion subsystem 204 (e.g., at plant startup), or may be at a lower temperature than desired. Using one or more heaters 302, 304 provides a buffer between the shale combustion subsystem 204 and the retort 234 for reheating or producing steam.

In the depicted embodiment, the steam temperature control subsystem 236 includes a plurality of steam/water mixers 306 for reducing steam temperature to a plurality of different temperatures for delivery to different portions of the retort 234. Steam/water mixers 306 are depicted collectively as a black box in FIG. 3, but may in reality be disposed near each other or at spatially distant locations in different steam lines. In various embodiments, steam/water mixers 306 may be commercially available attemperators, or the like, which reduce steam temperature by mixing the steam with water. Thus, the steam temperature control subsystem 236 may output steam at a variety of temperatures by heating steam to a high temperature, splitting the heated steam into different output lines, and reducing the temperature of the steam in one or more of the output lines. The output lines thus convey steam at different temperatures to the retort 234.

Figure 4:
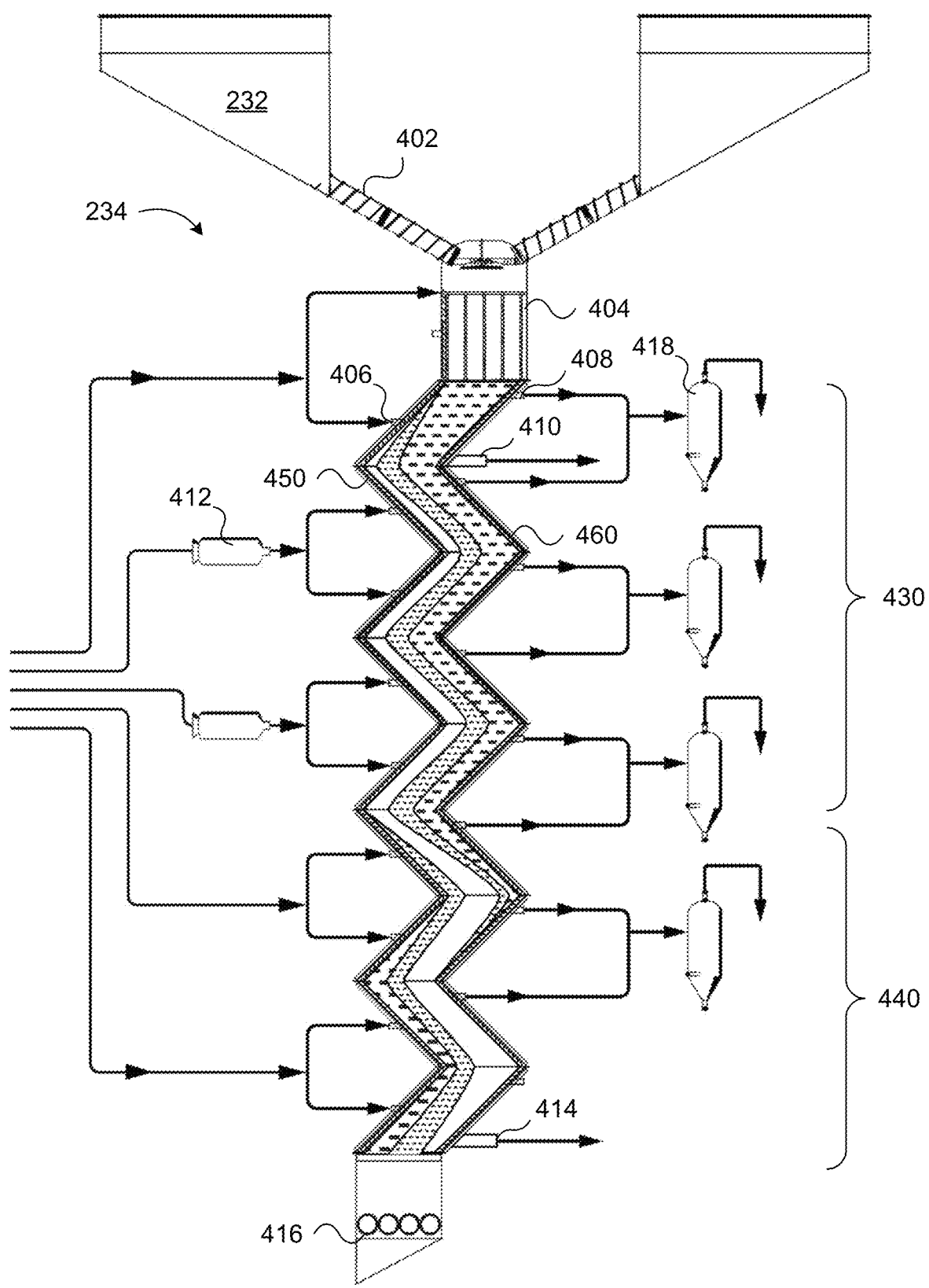
FIG. 4 is a diagram illustrating one embodiment of a retort.

FIG. 4 is a diagram illustrating one embodiment of a retort 234, with associated components for a shale pyrolysis system 100 as described above. The retort 234 and certain other components are shown in cross section, in a side view, to illustrate internal components. Certain lines inside the retort 234 are illustrations of shale flow or heat flow through the retort 234, and not of the physical structure of the retort 234. As in FIG. 3, lines or other connectors between components or subsystems indicate the flow of steam or other gases between components, as in an electrical schematic diagram, to indicate how components or subsystems are coupled together and are not intended to imply exact spatial relationships between components. Additionally, various components depicted in the Figures may be omitted in some embodiments of a system 100, and/or various components omitted from the Figures may be included in some embodiments of a system 100. For example, although FIG. 3 depicts nine angled sections of a retort 234, a retort 234 in another embodiment may have more or fewer than nine sections.

Shale is loaded into the retort 234 at or near the top, is pyrolyzed as it descends through the retort 234, and is removed from the bottom of the retort 234. The retort 234 includes a first side 450 (depicted to the left in FIG. 4), and a second side 460 (depicted to the right in FIG. 4) opposite the first side 450. In the depicted embodiment, the first and second sides 450, 460 include descending angled surfaces at alternating angles to produce zig-zag motion of shale descending through the retort 234. The first and second sides 450, 460, in the depicted embodiment, both have zig-zag shapes produced by the descending angled surfaces at alternating angles. Other sides of the retort 234 that couple the first side 450 to the second side 460, not shown in the cross section view of FIG. 4, (e.g., a front side and a back side) may be flat.

The first and second zig-zag sides 450, 460 are aligned so that descending angled surfaces of both sides are parallel (or substantially parallel) producing a channel for descending shale where the width of the channel, or the horizontal area of the channel at different points, is constant or substantially constant. The retort 234 is operated when filled with shale, and the shale may be moved as a (not strictly vertical) column of solid shale particles, rather than being gas-fluidized or liquid-fluidized. Downward but angled motion of the shale at alternating angles between zig-zag sides produces shear between different horizontal planes or of the shale, preventing the shale particles from fusing together. Angled surfaces support the descending shale, reducing geo load at the bottom of the retort 234.

In some embodiments, angled sections of the retort 234 can be individually assembled and transported on standard-size trucks, then assembled at the location where the retort 234 will be operated. Sections may include outer steel surfaces of the retort 234, which may be flange-bolted together, insulation, and distributors 406 or collectors 408 which are described below.

Shale is conveyed to hoppers 232. In some embodiments, shale may be mined and groomed 4 inch minus shale, with a particle size of four inches or less. In some embodiments, hoppers 232 may be alternately filled and emptied, so a first hopper is filled while shale is loaded into the retort 234 from a second hopper, and vice versa.

One or more augers 402 load shale from the hoppers 232 into a preheat section 404 of the retort 234. Shale is loaded at the top of the retort 234 and removed from the bottom of the retort 234 while the retort 234 is running, so the shale is loaded into the retort 234 through one or more gas and mechanical interlocks that prevent gases from flowing backwards out of the retort 234 to augers 402 and hoppers 232. In some embodiments a deflector cone or wedge is disposed at the ends of the one or more augers 402, to direct shale particles downward into the retort 234.

Lines with arrows in FIG. 4 represent the flow of steam into the retort 234 from the steam temperature control subsystem 236 at the left side of FIG. 4, and the flow of steam, gases, and liquids out of the retort 234 at the right side of FIG. 4. Superheated steam enters the preheat section 404 of the retort 234, and is distributed through the shale particles to preheat the shale through preheat steam distributors, which are described below with reference to FIG. 5.

Shale descending out of the preheat section 404 enters a first angled section of the retort 234. The shale descends down through subsequent angled sections of the retort 234 in zig-zag fashion. In some embodiments, flow of the shale is laminar rather than turbulent, so that shale particles tend to stay in zig-zag "lanes" without a large degree of mixing across the horizontal x-y plane. However, oblique descending motion of the shale at alternating angles may facilitate high volume flow for faster shale processing, consistent shear between x-y planes to avoid fusing shale particles together, consistent transfer of heat and pyrolyzed gases/vapors across the retort 234 (as described below), a slight tumble of shale particles against each other to facilitate heat transfer, and changing gas pathways across the retort 234 between moving shale particles (resulting in even heat transfer). Heat transfer by confection, conduction and radiation across tumbling shale particles is facilitated by changing heat transfer pathways between the moving shale particles.

At the bottom of the retort 234, a gas interlock prevents gases from exiting the retort 234 with the spent (e.g., pyrolyzed) shale. One or more grinders 416 grind the shale exiting the retort 234. A shaker grate may be disposed above the grinders 416, in some embodiments, to control the descent of the shale. In the depicted embodiment, grinders 416 control the flow of shale out of the retort 234. The speed of the grinders 416 may be controlled by a retort operator to control the volume flow of shale through the retort 234. In some embodiments, primary grinders 416 may be provided to control the flow of shale, and secondary grinders (not shown) may be provided to grind the shale more finely than the primary grinders 416. Spent shale from the retort 234 has had oil and gas products from kerogen pyrolyzed and removed, but includes carbon that may be combusted at temperatures higher than pyrolysis temperatures. The spent shale, in various embodiments, may be transported to a shale combustion subsystem 204 as described above. A shale combustion subsystem 204 is described in further detail below with reference to FIGS. 9 and 10.

In the depicted embodiment, steam distributors 406 are coupled to a first side 450 of the retort 234, and collectors 408 are coupled to the second side 460 of the retort 234. Superheated steam is used to heat and pyrolyze the shale, producing oil and gas products from kerogen in the shale, which are removed from the retort 234 as gases and vapors. The term gases may also be used herein in a general sense to refer to gases and/or vapors. The distributors 406 and collectors 408 are coupled to the first and second sides 450, 460, respectively, to produce crossflow of steam and heat from the first side 450 to the second side 460, across the shale particles descending through the retort 234. Gases produced by shale pyrolysis are entrained in the crossflow of steam, and exit the collectors 408.

A steam temperature control subsystem 236 produces the superheated steam. In some embodiments, if some portions of the steam temperature control subsystem 236 are located at a distance from the retort 234 that allows steam to cool, the steam temperature control subsystem 236 may include one or more additional heaters 412 located nearer to the retort 234, to boost steam temperatures for steam delivered to certain portions of the retort 234. The steam temperature control subsystem 236 may be coupled to the steam distributors 406, and may be configured to deliver higher-temperature steam to an upper portion 430 of the retort 234 and lower-temperature steam to a lower portion 440 of the retort 234. In the depicted embodiment, the upper portion 430 of the retort 234 includes the upper five angled sections, and the lower portion 440 of the retort 234 includes the lower four angled sections. In another embodiment, upper and lower portions 430, 440 may be divided differently.

Higher temperature steam from the steam temperature control subsystem 236 enters the first side 450 of the retort 234 at distributors 406 in the upper portion 430 of the retort 234. In some embodiments, higher-temperature steam may be at or above a shale pyrolysis temperature. For example, if pyrolysis occurs at 650° F., higher temperature steam may be at a temperature of approximately 800° F.

Lower-temperature steam from the steam temperature control subsystem 236 enters the first side 450 of the retort 234 at distributors 406 in the lower portion 440 of the retort 234. Lower-temperature steam may be superheated steam, above the boiling point of water to avoid condensation in the retort 234, but may be at a significantly lower temperature than the higher temperature steam. For example, in one embodiment, the lower temperature steam entering the lower portion 440 of the retort 234 may be cooled (by mixing with water) to approximately 250° F.

Steam in the preheat section 404 of the retort 234 may condense on cold shale as it preheats the shale. In the upper portion 430 of the retort 234, crossflow of superheated steam may drive the condensate across the retort 234 to one or more water collectors 410. Preheating of shale and removal of condensed water avoids the need to heat the condensed water back up to shale pyrolysis temperatures while heating the shale. Preheating the shale and removing the condensed water also prevents superheated steam distributed in lower sections of the retort 234 from condensing on the shale.

In the upper portion 430 of the retort 234, higher-temperature steam heats the shale from the first side 450, driving a wave or gradient of heat across the shale from the first side 450 to the second side 460. In FIG. 4, shading within the retort 234 indicates temperature zones, with white or no shading (e.g., at the left of the upper portion 430 of the retort 234) indicating the highest temperatures, large dashes (e.g., at the right of the upper portion 430 of the retort 234) indicating the lowest temperatures, and small dashes indicating intermediate temperatures. Heat moves from the first side 450 to the second side 460 by convection of the steam and pyrolyzed gases, conduction between shale particles, and radiation from hot shale particles and retort sides. As the shale heats up, pyrolysis produces oil and gas products in gaseous form, which exit through collectors 408.

In the lower portion 440 of the retort 234, lower-temperature steam cools the shale. Crossflow of the lower-temperature steam continues to drive heat across from the first side 450 of the retort 234 to the second side 460. Thus, shale at the first side 450 of the retort 234 is pyrolyzed in the upper portion 430, where shale at the second side 460 of the retort 234 is not yet fully heated, and shale at the second side 460 of the retort 234 is pyrolyzed in the lower portion 440 as heat transfers across from the first side 450, despite the overall cooling of the shale in the lower portion 440.

Gases and vapors at different temperatures exit different sections of the retort 234 through collectors 408. Some vapors of heavier oils may be driven across the retort 234 to the second side 460 and run down the second side 460 as liquids, to be removed via one or more oil collectors 414. Gases exiting the retort 234 via collectors 408 may be directed through cyclonic separators 418 to remove fine particles entrained in the exiting gases, and may then enter a distillation subsystem 240, which is described below. Liquids exiting the retort 234 (e.g., via one or more water collectors 410 and/or oil collectors 414 may be heated to vaporize the liquids and separate them from solids (e.g., fine shale particles) suspended in the liquid, and the resulting vapor may also enter the distillation subsystem 240. For example, the oil collector may be couple may be coupled to higher-temperature steam to vaporize collected oil.

Although the above description broadly describes delivery of higher-temperature and lower-temperature steam to the retort 234, the steam temperature control subsystem 236 may use heaters 302, 304 and/or steam/water mixers 306 to produce steam at a plurality of different temperatures for delivery to different portions of the retort 234. In one embodiment, the steam/water mixers 306 are configured to produce steam above 600° F. for distribution to a preheat section 404 of the retort 234. In some embodiments, steam/water mixers 306 are configured to produce steam at or above 625° F., at or above 650° F., or at or above 675° F. for distribution to a preheat section 404 of the retort 234.

In one embodiment, the steam/water mixers 306 are configured to produce steam above 750° F. for distribution to an upper portion 430 of the retort 234. In some embodiments, steam/water mixers 306 are configured to produce steam at or above 800° F., at or above 850° F., at or above 900° F., or at or above 950° F. for distribution to an upper portion 430 of the retort 234.

In one embodiment, the steam/water mixers 306 are configured to produce steam below 300° F. for distribution to a lower portion 440 of the retort 234. In some embodiments, steam/water mixers 306 are configured to produce steam at or below 275° F., at or above 250° F., or at or below 225° F. for distribution to a lower portion 440 of the retort 234.

Although the use of steam is described herein for heating and pyrolyzing shale, hot gases other than steam may be used in some embodiments to similarly heat and pyrolyze shale. In further embodiments, the structures described herein as steam distributors 406 and collectors 408 may be used as hot gas distributors and collectors.

Figure 5:
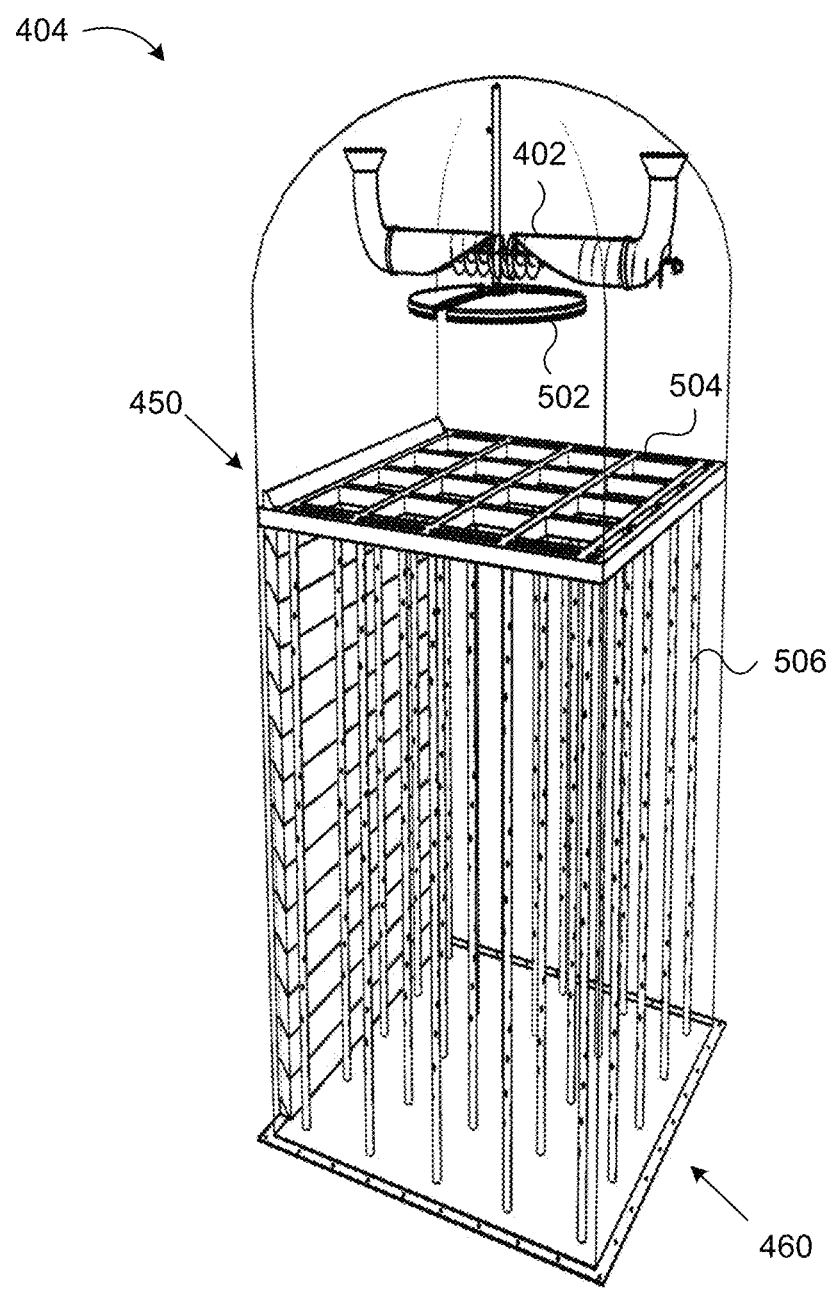
FIG. 5 is a perspective view illustrating one embodiment of a preheat section for a retort.

FIG. 5 is a perspective view illustrating one embodiment of a preheat section 404 for a retort 234. As in FIG. 4, certain exterior components have been omitted to depict components in the interior of the retort 234. As described above, the preheat section 404 in the depicted embodiment receives and preheats shale entering the top of the retort 234. In the depicted embodiment, augers 402 move shale from hoppers 232 into the retort 234, and a deflector cone 502 at the ends of the augers 402 directs direct shale particles downward into the retort 234. Unlike in other sections of the retort 234, where steam distributors 406 are coupled to the first side 450, the preheat steam distributors 506 in the preheat section 404 are disposed between the first side 450 and the second side 460 to distribute steam more uniformly within the shale bed. This more uniform distribution of steam may increase the temperature of the shale above the boiling point of water across the preheat section 404, thus avoiding cold spots where superheated steam added lower in the retort 234 might condense.

In the depicted embodiment, the preheat steam distributors 506 are hollow vertical rods with side ports. These hollow vertical rods 506 extend downward from a grate 504 with hollow members for receiving steam and distributing steam to the hollow vertical rods 506. Thus, steam provided to the preheat section 404 enters the grate 504 and the hollow vertical rods 506, and exits the rods 506 into the shale bed via the side ports in the rods 506. The use of a grate 504 and hollow vertical rods 506 to distribute steam allows the shale to travel vertically through the preheat section 404, while steam is distributed to preheat shale across the retort 234 rather than only at the first side 450. However, in various other embodiments, preheat steam distributors 506 of various other or further shapes may be used to preheat shale entering the top of the retort 234.

Figure 6:
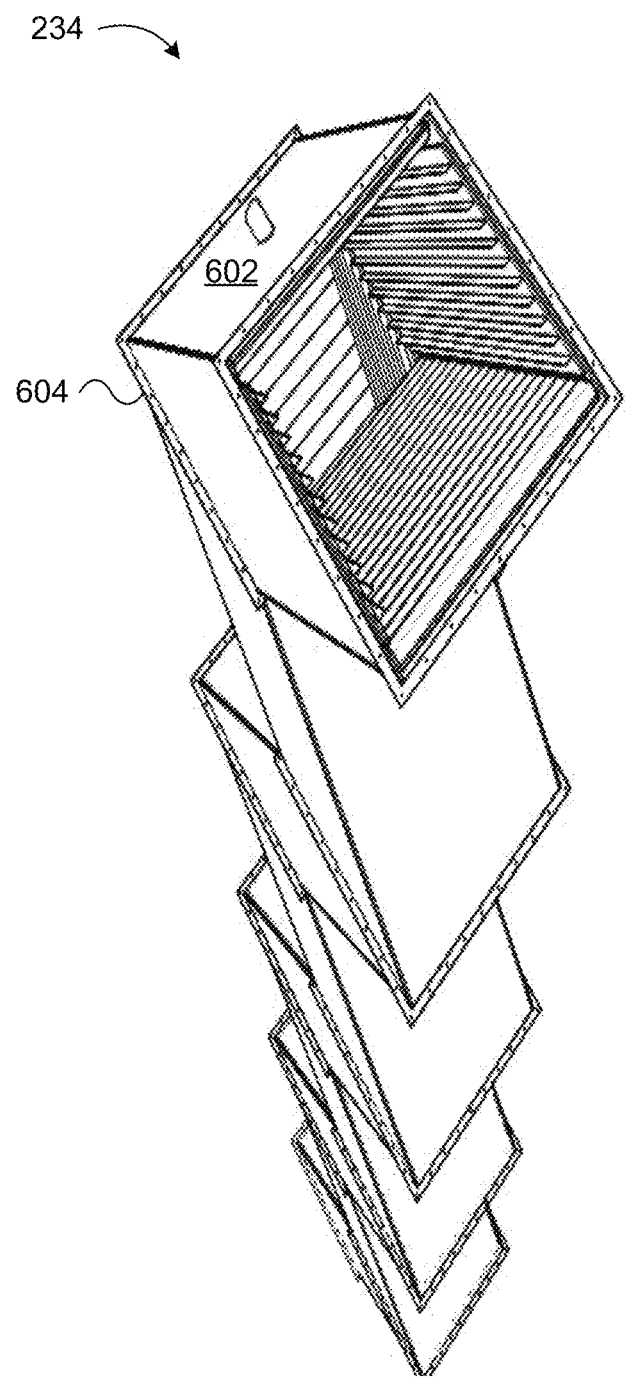
FIG. 6 is a perspective view illustrating a portion of a retort below a preheat section, in one embodiment.

FIG. 6 depicts the retort 234 in a perspective view, looking down into the retort 234 from below the preheat section 404. Individual angled sections 602 of the retort 234 may be transported separately, and bolted together at flanges 604. Additionally, some components that were omitted for clarity in FIG. 4, such as front and back walls, are depicted in FIG. 6. Ribs on the flat front and back sides of the retort 234 prevent steam and pyrolysis gases from skirting around the perimeter of the shale bed.

Figure 7:
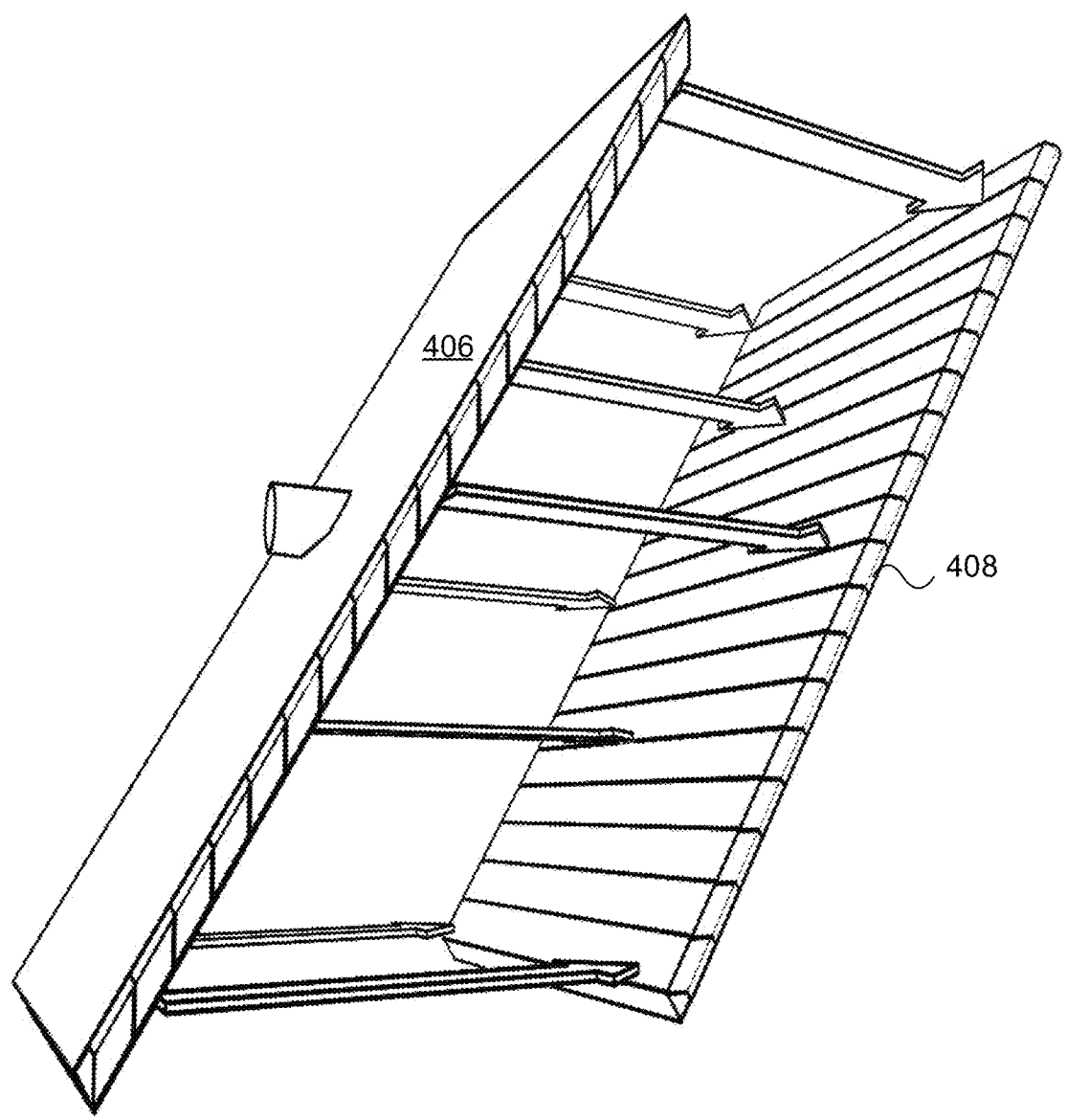
FIG. 7 is a perspective view illustrating a steam distributor and a collector for a retort, in one embodiment.

FIG. 7 depicts a steam distributor 406 and a collector 408 for a retort 234, in one embodiment. Arrows illustrate the flow of steam from the distributor 406 to the collector 408, across the retort 234. In some embodiments, distributors 406 and collectors 408 are made of steel, which is treated as sacrificial. Sacrificial distributors 406 and collectors 408 may be replaced when the retort 234 is serviced. A distributor 406 or a collector 408 includes a first side with a large hole, a second side with small slots or holes, and an air gap between the first and second sides. In one embodiment, the sides may be two inches thick, and the air gap may be six inches thick. For distributors 406, steam enters from the steam temperature control subsystem 236 through the large hole, passes through the air gaps and exits the distributor 406 to heat shale particles in the retort 234 through the small slots. For collectors 408, steam and other gases exit the shale and enter the collector 408 through the small holes, cross the air gap, and are removed from the retort 234 through the large hole. In some embodiments, collectors 408 may include a filter medium such as coiled steel in the air gap, to remove particles from the exiting gases.

In some embodiments, distributors 406 and/or collectors 408 in various sections of the retort 234 may be separated from outer walls of the retort 234 by insulation. Outer walls of may be bolted or otherwise fastened together, and may be air-cooled. Due to air cooling and insulation, outer walls may be at a lower temperature than distributors 406 and/or collectors 408, and may therefore expand less than distributors 406 and/or collectors 408. Accordingly, distributors 406 and/or collectors 408 may be shorter or smaller than outer walls of corresponding sections of the retort 234, so that expansion of the distributors 406 and/or collectors 408 does not push the sections of the retort 234 apart.

Figure 8:
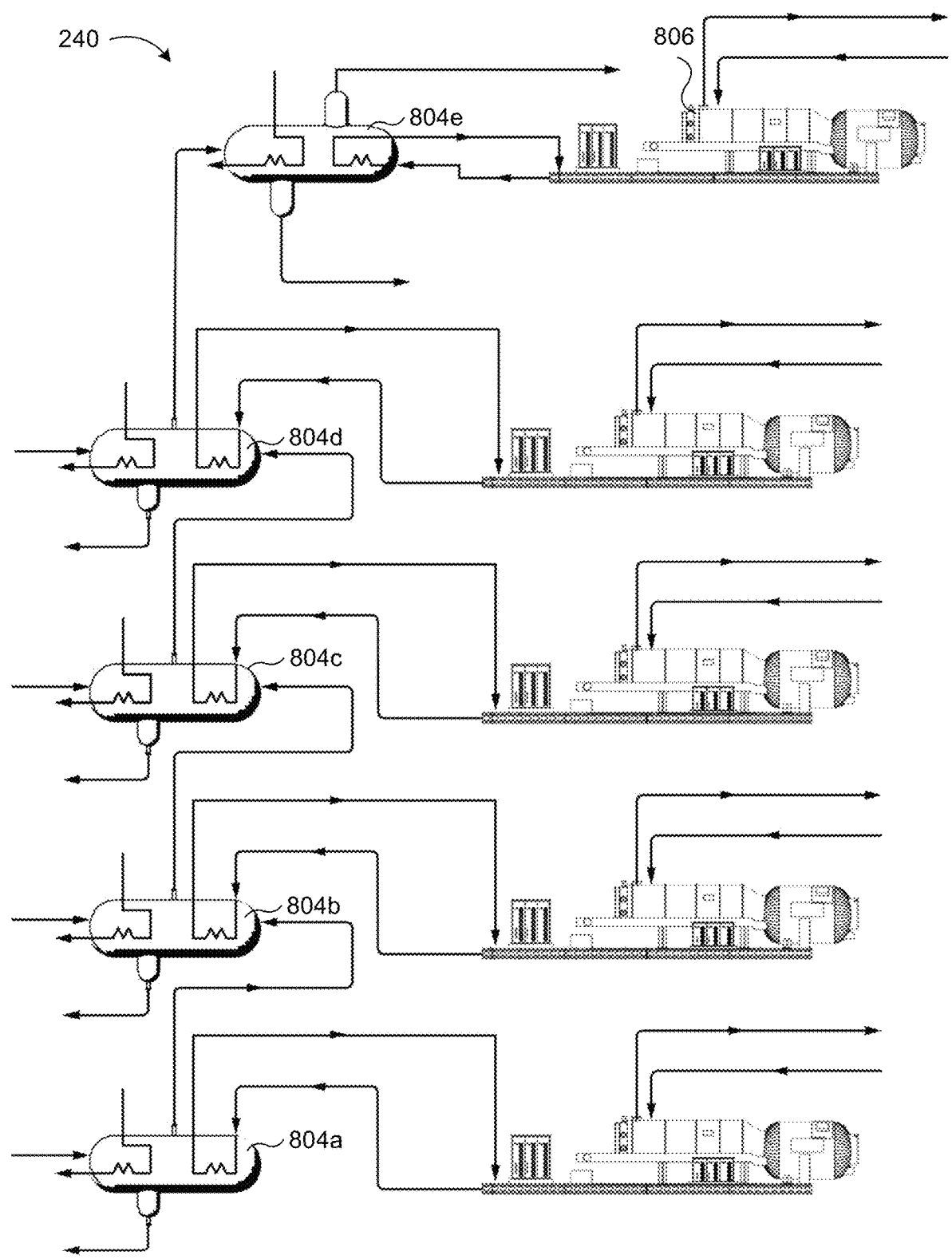
FIG. 8 is a diagram illustrating one embodiment of a distillation subsystem.

FIG. 8 is a diagram illustrating one embodiment of a distillation subsystem 240, as described above. In some embodiments, a distillation subsystem 240 includes a plurality of liquid/gas separation vessels 804*a-e* that receive gases from the retort 234, and a plurality of organic Rankine cycle (ORC) generators 806 corresponding to the separation vessels 804*a-e*. As in other diagrams herein, lines or pipes indicate connections or gas flow between components without indicating exact spatial relationships. Additionally, in various embodiments, a distillation subsystem 240 may include more or fewer separation vessels 804*a-e* and ORC generators 806. For example, FIG. 1 depicts a much larger number of ORC generators 806 in the distillation subsystem 240.

Gases (and liquids) exiting the retort 234 enter the distillation subsystem 240 at the left side of FIG. 8, having been filtered at cyclonic separators 418 to remove fine particles entrained in the exiting gases. As described above, gas fractions at different temperatures exit different sections of the retort 234, and are received by the distillation subsystem 240. Lighter hydrocarbons exit the retort 234 as shale particles are pyrolyzed, and may be found in gas fractions from multiple sections of the retort 234. Medium-weight to heavy hydrocarbons may be produced by pyrolysis at a pyrolysis temperature that is lower than the boiling point for those oils, and may condense on shale particles in the retort 234 as liquid. As the heat waves are driven across the retort 234 and the shale particles descend, medium-weight to heavy hydrocarbons may be volatilized lower in the retort 234 so that medium to heavy hydrocarbons exit the retort 234 in gas fractions from medium to low sections of the retort 234, and heavy hydrocarbons exit the retort 234 lower still. Thus, in general, gas fractions from the top of the retort 234 may include light hydrocarbons, gas fractions from the middle of the retort 234 may include light and medium hydrocarbons, and gas fractions from the bottom of the retort 234 may include light, medium, and heavy hydrocarbons.

The distillation subsystem 240 includes a plurality of liquid/gas separation vessels 804*a-e*, and a plurality of ORC generators 806 (or other heat-powered electrical generators) corresponding to the separation vessels 804*a-e*. The separation vessels 804*a-e* include heat exchangers through which the working fluid of the ORC generators 806 circulates, to transfer heat from the gas fractions to the working fluid. This heat transfer results in condensation of distillate products, which may be removed from the separation vessels 804*a-e* as liquids. The ORC generators 806 are coupled to and powered by heat exchangers of the separation vessels 804*a-e*. In some embodiments, ORC generators 806 may be TURBODEN® generators or other electrical generators powered by heating a working fluid. The ORC generators 806 produce electricity 100, and may be cooled by cooling water, which in turn may be circulated to ponds 220 where algae may use low grade waste heat. Flow of cooling water is indicated by arrows into and out of the ORC generators 806 at the right of FIG. 8. Cooling water may be provided to ORC generators from a common source, or may be provided to groups of ORC generators chained together so that the cooling water is gradually heated by multiple generators before being circulated to algae ponds 220.

The ORC generators 806 include a plurality of different working fluids (for different generators 806) which circulate through heat exchangers of corresponding separation vessels 804*a-e* in self-contained loops, thus producing different condensation temperatures for gases in different separation vessels 804*a-e*. In some embodiments, the combination of multiple liquid/gas separation vessels 804*a-e* with different condensation temperatures may function similarly to a distillation column to produce heavier and lighter oil fractions, which are removed from the liquid outputs of the liquid/gas separation vessels 804*a-e*, and stored in liquid storage tanks 252.

In the depicted embodiment, the separation vessels 804*a-e* include four separation vessels 804*a-d* for condensing hydrocarbons at different condensation temperatures, and a fifth separation vessel 804*e* for condensing water. In another embodiment, a system 100 may include more or fewer separation vessels. For example, to produce more or fewer than four different distillate fractions at different condensation temperatures, more or fewer than four separation vessels for condensing hydrocarbons may be provided.

In the depicted embodiment, the liquid/gas separation vessels 804*a-e* are coupled in a chain, so that gases exiting earlier separation vessels in the chain are received by later separation vessels in the chain. For example, the gas output of separation vessel 804*a* is coupled as an input to separation vessel 804*b*, the gas output of separation vessel 804*b* is coupled as an input to separation vessel 804*c*, the gas output of separation vessel 804*c* is coupled as an input to separation vessel 804*d*, and the gas output of separation vessel 804*d* is coupled as an input to separation vessel 804*e*. Chaining together of separation vessels 804*a-e* allows lighter hydrocarbons that are not condensed with the heavier oil fractions to transfer to subsequent separation vessels to be potentially condensed with lighter oil fractions. In the depicted embodiment, the gas output of separation vessel 804*d* includes gases that were not condensed in the separation vessels 804*a-d*, and removed as oil fractions. The non-condensed gases received by separation vessel 804*e* may include lighter hydrocarbons $C_1$-$C_6$, hydrogen, carbon dioxide, hydrogen sulfide, steam and/or water vapor.

In the depicted embodiment, two-stage distillation is performed at separation vessel 804*e* to condense water, which is removed from the vessel 804*e* as a liquid and stored in hot feedwater tanks 212. In some embodiments, a separation vessel may include two heat exchangers. In the depicted embodiment, two heat exchangers per separation vessel 804*a-e* are indicated as wavy lines inside the outline of the separation vessels 804*a-e*. One of the heat exchangers (to the right in FIG. 8) for a separation vessel 804*a-e* is coupled to the corresponding ORC generator 806, so that the working fluid for the ORC generator 806 circulates through that heat exchanger, and the boiling point of that fluid determines the temperature at which hydrocarbons condense within the separation vessel 804*a-e*.

In some embodiments, water distilled in separation vessel 804*e* may be circulated through second heat exchangers (to the left in FIG. 8) of the other separation vessels 804*a-d*, adding a portion of the latent heat of vaporization back to the water, thus allowing the water to be more rapidly boiled to produce steam in the shale combustion subsystem 204. Heat exchangers used to heat water at the separation vessels 804*a-d* may be chained together so that water passes through and is heated by a series of the separation vessels 804*a-d* prior to being stored in the feedwater tanks 212.

Water from the feedwater tanks 212 may be used to produce superheated steam in the shale combustion subsystem 204, as described below, or may be used by steam/water mixers 306 to control the temperature of superheated steam entering different sections of the retort 234, as described above. With the water removed at separation vessel 804*e*, other non-condensed gases, which may include lighter hydrocarbons $C_1$-$C_6$, hydrogen, carbon dioxide, and/or hydrogen sulfide are removed from the gas output of separation vessel 804*e*. These gases may be processed by a gas plant to separate, purify, or otherwise treat or use the gases, and stored in gas storage tanks 254.

Figure 9:
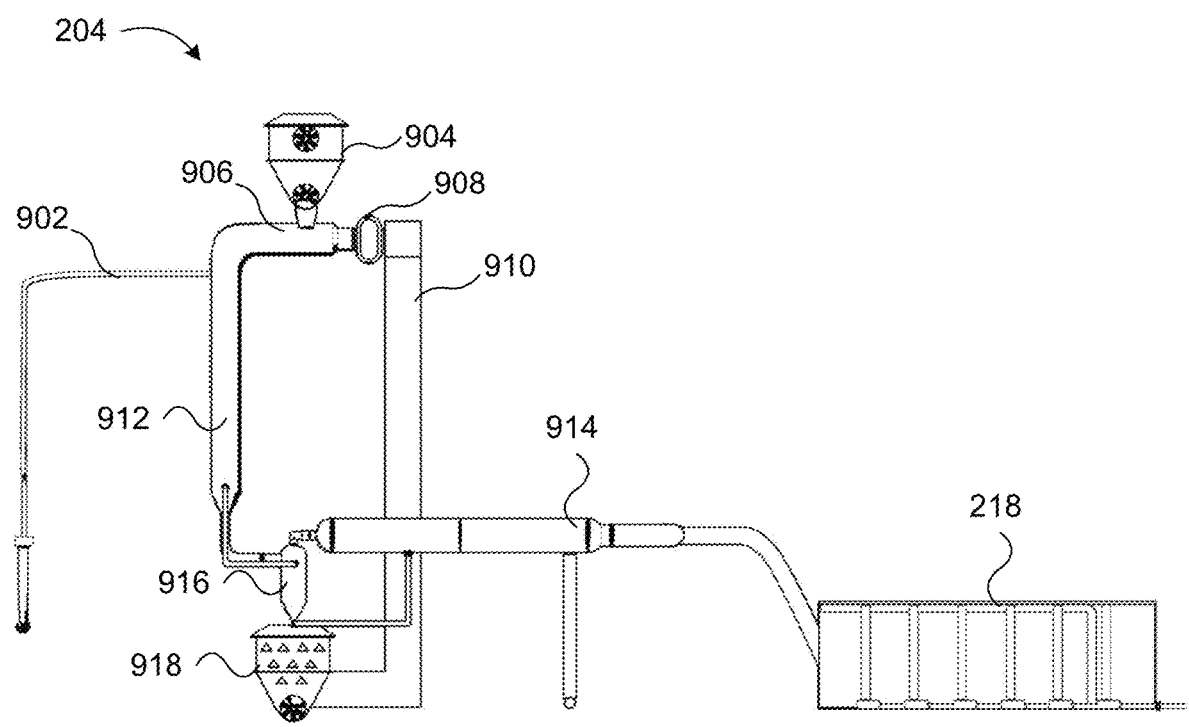
FIG. 9 is a diagram illustrating one embodiment of a shale combustion subsystem.

FIG. 9 is a diagram illustrating one embodiment of a shale combustion subsystem 204, in a side view. As described above, a shale combustion subsystem 204 combusts pyrolyzed shale from the retort 234, and uses heat from the combustion to boil water and superheat the resulting steam. In the depicted embodiment, the shale combustion subsystem 204 includes an upper hopper 904, a combustion chamber 906, a blower 908, a duct 910, a heat exchanger 912, a boiler 914, a cyclonic separator 916, and a lower hopper 918. Superheated steam exits the shale combustion subsystem 204 to the steam temperature control subsystem 236 via steam pipe 902, while gasses from combustion exit the boiler 914 to the filter house 218. Although the side view of FIG. 9 shows one combustion chamber 906, one heat exchanges 912, one boiler 914, and so on, some embodiments of a system 100 may include multiple combustion chambers 906, heat exchangers 912, boilers 914, and so on.

In the depicted embodiment, pyrolyzed shale received from the retort 234 is combusted in one or more combustion chambers 906, and heat from the combustion of the pyrolyzed shale is used in one or more heat exchangers 912 for superheating steam for the steam temperature control subsystem 236. In the depicted embodiment, the steam is produced in one or more boilers 914. In general, in various embodiments, of a shale combustion subsystem 204, combusting or combusted shale and combustion gases may flow in one direction opposite to a counterflow of water and/or steam, to transfer heat from combustion into the water and/or steam.

Shale is conveyed to the upper hopper 904, and moved by augers into the combustion chamber 906. The shale is combusted in the combustion chamber 906, in a flow of air provided by blower 908. In some embodiments, shale may be gas-fluidized by the air from the blower 908, resulting in efficient combustion due to a high surface area for contact between air and finely ground shale. Shale continues to combust as it descends through heat exchanger 912. The heat exchanger 912 is jacketed so that steam flows up along the outside, so that descending and combusting shale and gases in the center of the heat exchanger 912 heats the ascending steam in the jacket. Combustion gases also move down through the heat exchanger 912 due to expansion of the gases in combustion, the pressure maintained by the blower 908, and pressure from the weight of falling shale particles. One or more cyclonic separators 916 are disposed between the heat exchanger(s) 912 and the boiler(s) 914, for removing solid combusted shale particles from the hot combustion gases. In some embodiments, the cyclonic separators 916 include one or more heat exchangers inside the cyclonic separators 916 and/or as a jacket to further transfer heat from the shale and gases to the steam. The combusted shale descends into the lower hopper 918, and may be removed by a conveyor 208. The duct 910 may feed air to the blower 908, and may first direct the air past the shale in the lower hopper 918, to preheat the blower air.

The boiler(s) 914 are configured to heat pressurized water and produce steam at one or more pressure release valves (not shown). Water may be heated under pressure to above the (atmospheric pressure) boiling point, so that it converts to steam at the pressure release valves. Expansion as the water turns to steam or is subsequently heated may drive the steam through the rest of the system 100, including through jackets in the heat exchanger(s) 912 and cyclonic separators 916 where it receives heat from combustion. A pump 210 may provide pressurized water from the feedwater tanks 212 to the boiler(s) 914. Water may be received in the feedwater tanks 212 from the distillation subsystem 240 at or near the boiling point, and the feedwater tanks 212 may be insulated. In some embodiments, water may be held in the feedwater tanks 212 at the boiling point and with additional latent heat added, but not enough heat to boil the water. Supplying such heated water to the boilers 914 may allow efficient boiling to produce steam. Exhaust gas from combustion exits the boiler(s) 914 and is received by filter house(s) 218, which are described below.

Figure 10:
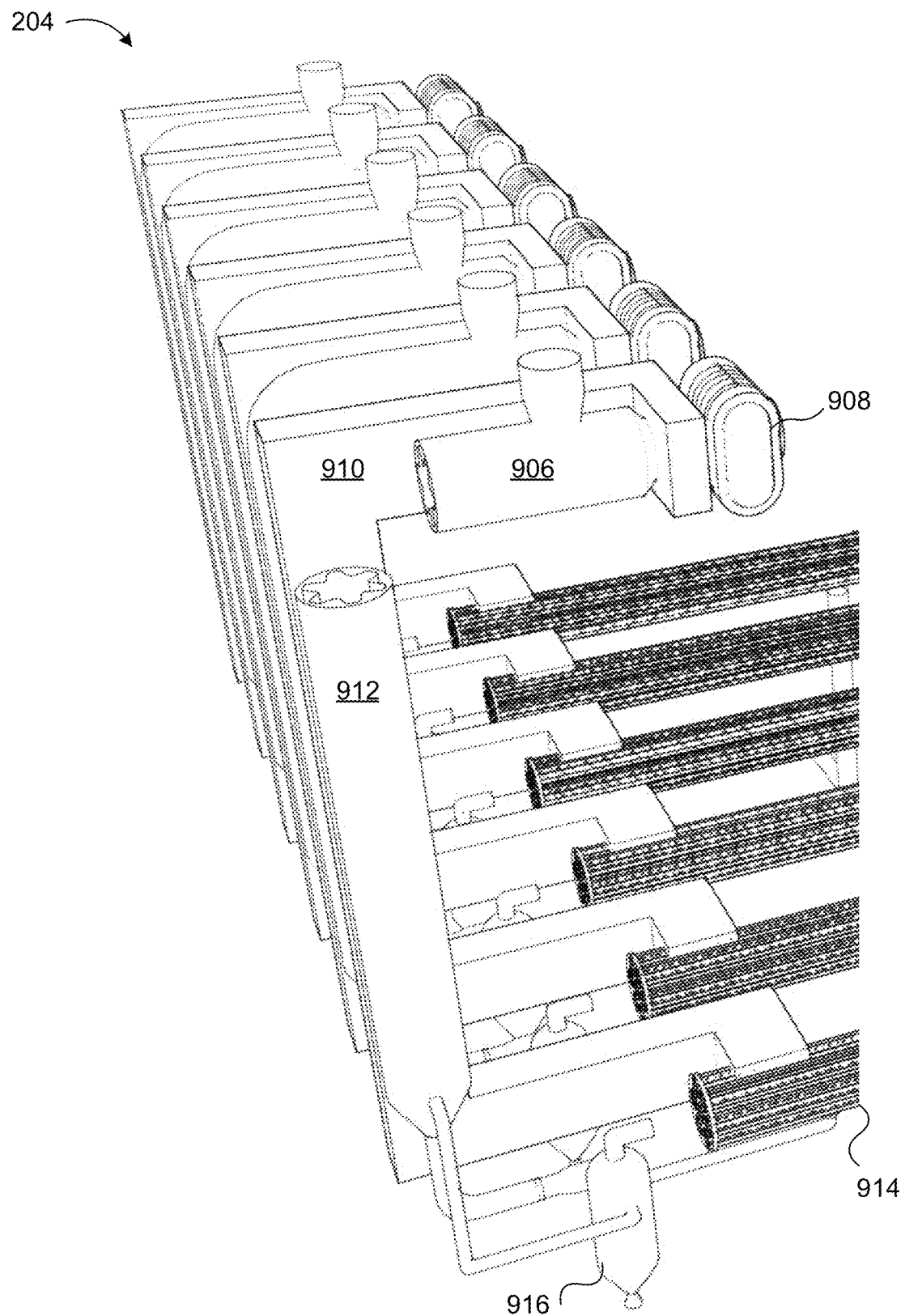
FIG. 10 is a perspective view illustrating embodiments of components of a shale combustion subsystem.

FIG. 10 is a perspective view illustrating embodiments of certain components of a shale combustion subsystem 204, as described above. The boiler 914 is depicted without its outer casing, and a section is not depicted between a combustion chamber 906 and a heat exchanger 912, to better illustrate internal components of the shale combustion subsystem 204. In the depicted embodiment, the heat exchangers 912 for superheating steam include vertical compartments for ascending steam to be heated by descending shale particles and combustion gases. In the depicted embodiment, the vertical compartments for ascending steam surround an inner compartment for descending shale particles and combustion gases. In the depicted embodiment, the boilers 914 include horizontal compartments for water (traveling right to left in FIG. 10) to be heated by gases (traveling left to right in FIG. 10) from which solids have been removed (e.g., by cyclonic separators 916).

Figure 11:
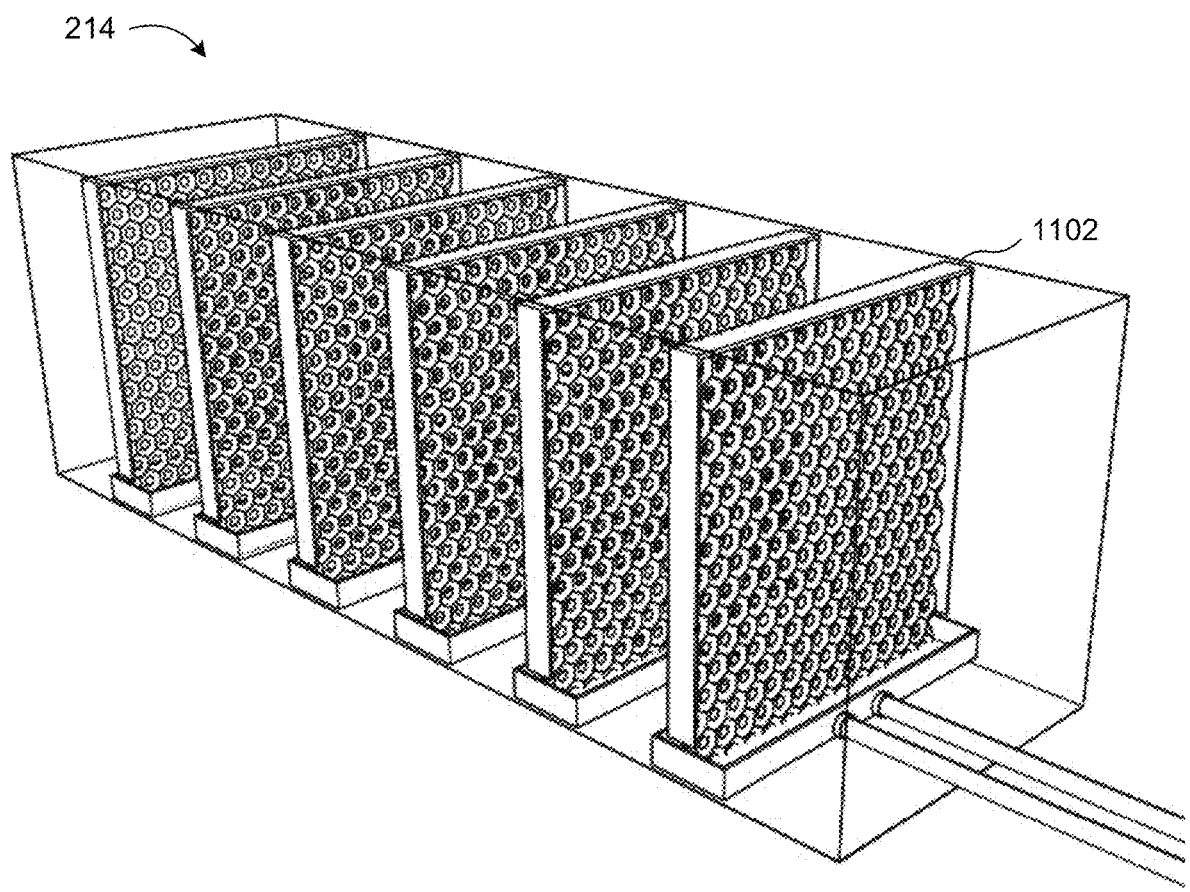
FIG. 11 is a perspective view illustrating one embodiment of a filter house.

FIG. 11 is a perspective view illustrating one embodiment of a filter house 218, as described above. Outer walls of the filter house 218 are not depicted, so as to better display internal components. In various embodiments, a filter house 218 may include a plurality of iron-zinc filters 1102. Combustion gases flow horizontally through holes in the filters 1102, and a vertical flow of water is provided (e.g., over the surface of the filters 1102, as drops descending between filters 1102, or the like). The iron-zinc filters 1102 remove hydrogen sulfide from a horizontal flow of combustion gases. The vertical flow of water cools the gases and removes carbon dioxide, so the carbon dioxide from the carbon gases becomes dissolved in the water. The resulting carbon enriched water may be provided to one or more algae ponds 220 for production of algae oil.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A shale pyrolysis system comprising:
    a retort comprising a first side and a second side, the second side opposite the first side, the first side and the second side comprising descending angled surfaces at alternating angles to produce zig-zag motion of shale descending through the retort;
    steam distributors coupled to the first side and collectors coupled to the second side to produce crossflow of steam and heat across the descending shale from the first side to the second side; and
    a steam temperature control subsystem coupled to the steam distributors and configured to deliver higher-temperature steam to an upper portion of the retort and lower-temperature steam to a lower portion of the retort.

2. The system of claim 1, wherein the steam temperature control subsystem comprises one or more heaters for increasing steam temperature, and a plurality of steam/water mixers for reducing steam temperature to a plurality of different temperatures for delivery to different portions of the retort.

3. The system of claim 2, wherein the plurality of steam/water mixers are configured to produce steam above 600° F. for distribution to a preheat section of the retort, steam above 750° F. for distribution to the upper portion of the retort, and steam below 300° F. for distribution to the lower portion of the retort.

4. The system of claim 1, wherein the retort comprises a preheat section for receiving and preheating shale entering the top of the retort, the preheat section comprising a plurality of preheat steam distributors disposed between the first side and the second side.

5. The system of claim 4, wherein the preheat steam distributors comprise hollow vertical rods with side ports, the hollow vertical rods extending downward from a grate with hollow members for receiving steam and distributing steam to the hollow vertical rods.

6. The system of claim 1, further comprising a shale combustion subsystem, the shale combustion subsystem comprising:
    one or more combustion chambers for combustion of pyrolyzed shale received from the retort; and
    one or more heat exchangers for superheating steam for the steam temperature control subsystem, using heat from the combustion of the pyrolyzed shale.

7. The system of claim 6, wherein the shale combustion subsystem further comprises one or more boilers for producing the steam.

8. The system of claim 7, wherein the one or more boilers are configured to heat pressurized water and produce steam at one or more pressure release valves, and wherein the shale combustion subsystem further comprises a pump for providing pressurized water to the boilers.

9. The system of claim 7, wherein the one or more heat exchangers for superheating steam comprise vertical compartments for ascending steam to be heated by descending shale particles and combustion gases, and wherein the one or more boilers comprise horizontal compartments for water to be heated by gases from which solids have been removed.

10. The system of claim 9, wherein the shale combustion subsystem further comprises one or more cyclonic separators disposed between the one or more heat exchangers for superheating steam and the one or more boilers, for removing the solids from the gases.

11. The system of claim 7, further comprising one or more filter houses comprising iron-zinc filters for removing hydrogen sulfide from a horizontal flow of combustion gases, and a vertical flow of water for removing carbon dioxide from the combustion gases.

12. The system of claim 1, further comprising a distillation subsystem, the distillation subsystem comprising a plurality of liquid/gas separation vessels that receive gases from the retort, and a plurality of organic Rankine cycle (ORC) generators corresponding to the separation vessels, wherein:
the ORC generators are coupled to and powered by heat exchangers of the separation vessels;
the ORC generators comprise different working fluids to produce different condensation temperatures for gases in different separation vessels; and
the separation vessels are coupled in a chain such that gases exiting earlier separation vessels in the chain are received by later separation vessels in the chain.

13. The system of claim 12, wherein the separation vessels comprise four separation vessels for condensing hydrocarbons at different condensation temperatures, and a fifth separation vessel for condensing water.

14. A method of shale pyrolysis, comprising:
providing a retort comprising a first side and a second side, the second side opposite the first side, the first side and the second side comprising descending angled surfaces at alternating angles to produce zig-zag motion of shale descending through the retort;
providing steam distributors coupled to the first side and collectors coupled to the second side to produce crossflow of steam and heat across the descending shale from the first side to the second side;
providing a steam temperature control subsystem coupled to the steam distributors and configured to deliver higher-temperature steam to an upper portion of the retort and lower-temperature steam to a lower portion of the retort;
filling the retort with shale;
moving shale through the retort by continuously removing shale at the bottom of the retort and adding shale at the top;
pyrolyzing the shale by using the steam temperature control subsystem and the steam distributors to deliver the higher-temperature steam to the upper portion of the retort and the lower-temperature steam to the lower portion of the retort; and
removing shale pyrolysis gases and the steam via the collectors.

15. The method of claim 14, further comprising:
providing a preheat section of the retort, comprising a plurality of preheat steam distributors disposed between the first side and the second side; and
delivering steam to the preheat section to preheat shale entering the top of the retort.

16. The method of claim 14, further comprising combusting pyrolyzed shale received from the retort to produce and superheat steam for the steam temperature control subsystem.

17. The method of claim 14, further comprising:
providing a plurality of liquid/gas separation vessels coupled in a chain such that gases exiting earlier separation vessels in the chain are received by later separation vessels in the chain; and
directing gases from the retort through the plurality of separation vessels to remove condensable hydrocarbons and water from the gases.

18. The method of claim 17 further comprising:
providing a plurality of organic Rankine cycle (ORC) generators coupled to and powered by heat exchangers of the separation vessels, wherein the ORC generators comprise different working fluids to produce different condensation temperatures for gases in different separation vessels;
removing different distillation cuts of condensed hydrocarbons, corresponding to the different condensation temperatures, from the separation vessels; and
using the ORC generators to produce electricity using heat from condensing the hydrocarbons.

* * * * *